(12) United States Patent
Volmering

(10) Patent No.: US 9,266,553 B2
(45) Date of Patent: Feb. 23, 2016

(54) STEERING COLUMN

(71) Applicant: TRW Automotive U.S. LLC, Livonia, MI (US)

(72) Inventor: Zachery R. Volmering, Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 14/310,257

(22) Filed: Jun. 20, 2014

(65) Prior Publication Data
US 2015/0367877 A1 Dec. 24, 2015

(51) Int. Cl.
B62D 1/184 (2006.01)
B62D 1/185 (2006.01)

(52) U.S. Cl.
CPC ............... *B62D 1/184* (2013.01); *B62D 1/185* (2013.01)

(58) Field of Classification Search
CPC .............................. B62D 1/184; B62D 1/185
USPC ........................................................ 74/493
See application file for complete search history.

(56) References Cited

U.S. PATENT DOCUMENTS

| 5,354,488 | A | * | 10/1994 | Shtarkman et al. | ........ 252/62.56 |
| 5,361,646 | A | | 11/1994 | Venable | |
| 5,678,454 | A | | 10/1997 | Cartwright et al. | |
| 5,711,189 | A | | 1/1998 | Cartwright et al. | |
| 5,813,699 | A | * | 9/1998 | Donner et al. | ................. 280/775 |
| 6,349,967 | B1 | * | 2/2002 | Cartwright | ................... 280/775 |
| 6,354,626 | B1 | * | 3/2002 | Cartwright | ................... 280/777 |
| 6,952,979 | B2 | | 10/2005 | Cartwright et al. | |
| 7,077,027 | B2 | * | 7/2006 | Krizan et al. | ................... 74/493 |
| 7,159,904 | B2 | * | 1/2007 | Schafer et al. | ................ 280/775 |
| 7,165,786 | B1 | * | 1/2007 | Sha et al. | ...................... 280/775 |
| 7,204,516 | B2 | * | 4/2007 | Schneider et al. | ............ 280/777 |
| 2014/0124282 | A1 | * | 5/2014 | Laval et al. | ................... 180/287 |

* cited by examiner

Primary Examiner — Paul N Dickson
Assistant Examiner — Darlene P Condra
(74) Attorney, Agent, or Firm — Tarolli, Sundheim, Covell & Tummino LLP

(57) ABSTRACT

A steering column for use in a vehicle including first and second steering column members movable relative to each other. A locking mechanism prevents relative movement between the first and second steering column members. A locking member has a locked position in which the locking mechanism prevents relative movement between the first and second steering column members. The locking member has a release position in which the locking mechanism permits relative movement between the first and second steering column members. A magnet retains the locking member in at least one of the locking position and the release position.

13 Claims, 4 Drawing Sheets

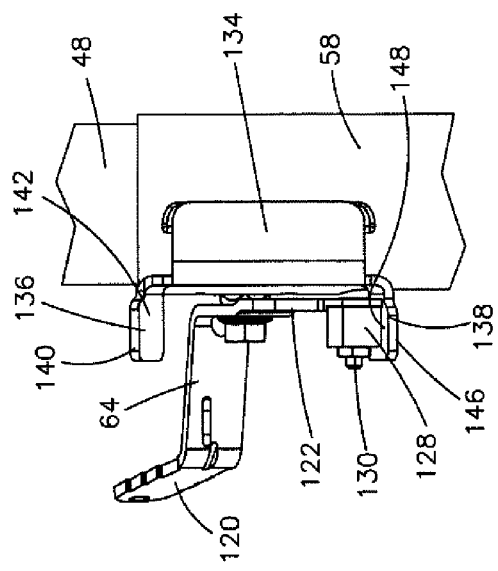
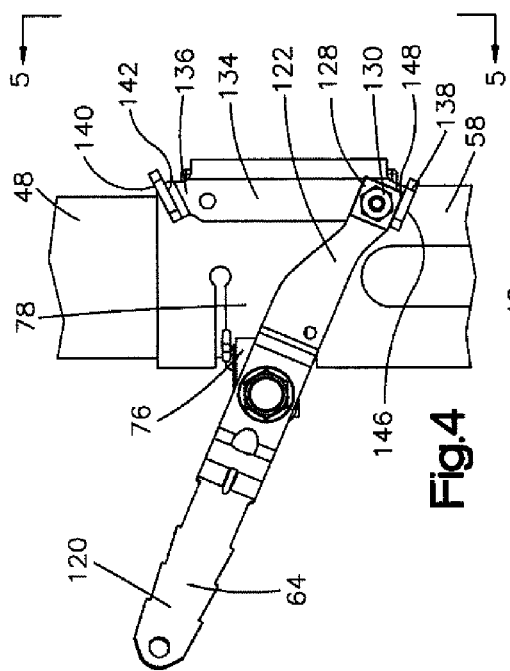
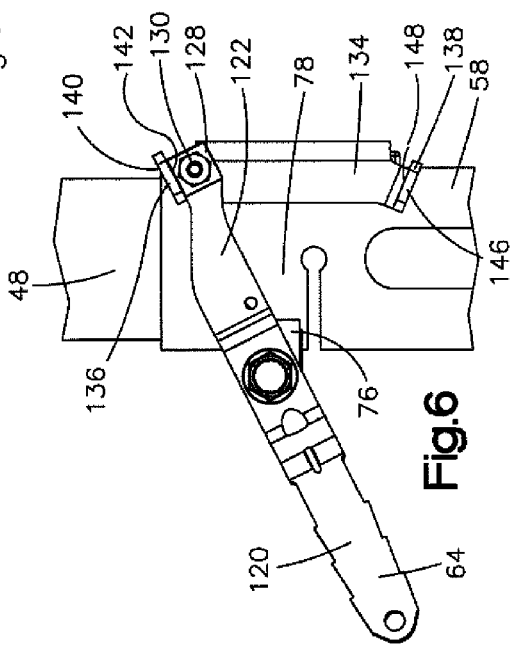

STEERING COLUMN

BACKGROUND OF THE INVENTION

The present invention relates to an adjustable steering column, and more specifically to a locking mechanism for an adjustable steering column.

A known steering column includes a first steering column member axially movable relative to a second steering column member. A telescope locking mechanism locks the first steering column member in any one of a plurality of axial positions relative to the second steering column member. Rotation of a lever about an axis in a first direction from a locking position releases the telescope locking mechanism to permit relative movement between the first and second steering column members. An input shaft is pivotable relative to the first steering column member. A tilt locking mechanism locks the input shaft in any one of a plurality of pivot positions relative to the first steering column member. Rotation of the lever about the axis in a second direction from the locking position releases the tilt locking mechanism to permit relative movement between the input shaft and the first steering column member.

SUMMARY OF THE INVENTION

The steering column of the present invention includes first and second steering column members movable relative to each other. A locking mechanism prevents relative movement between the first and second steering column members. A locking member has a locked position in which the locking mechanism prevents relative movement between the first and second steering column members. The locking member has a release position in which the locking mechanism permits relative movement between the first and second steering column members. A magnet retains the locking member in at least one of the locking position and the release position.

BRIEF DESCRIPTION OF THE DRAWINGS

The foregoing and other features of the present invention will become apparent to one skilled in the art upon reading the following description of the present invention with reference to the accompanying drawings, wherein:

FIG. 4 is a schematic view of a portion of the steering column showing a handle for locking mechanisms of the steering column in a locking position;

FIG. 5 is a view of the steering column taken along the lines 5-5 of FIG. 4; and FIG. 6 is a schematic view of a portion of the steering column showing the handle for the locking mechanisms in a release position.

DESCRIPTION OF EXEMPLARY EMBODIMENT

Figure 1:
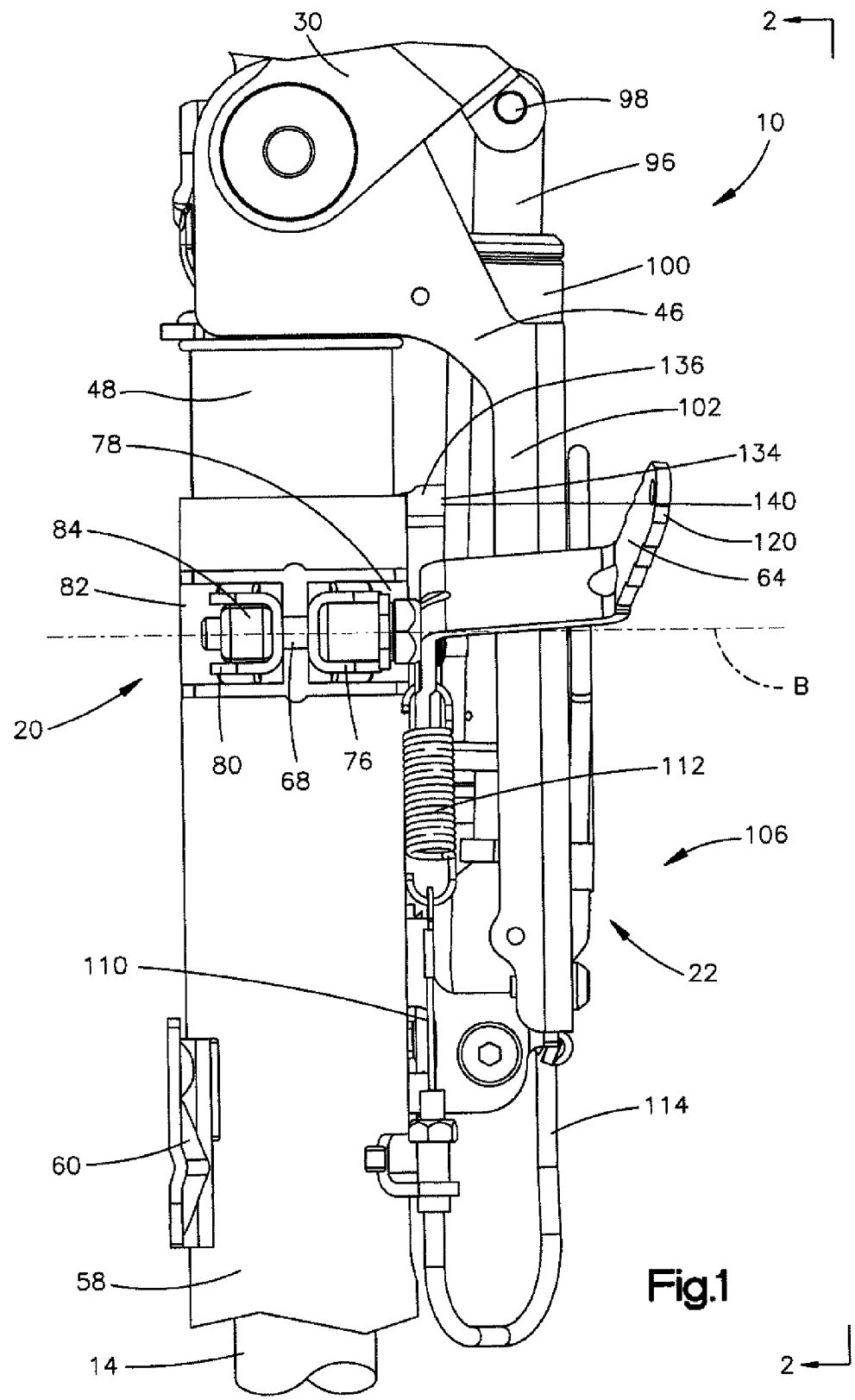
FIG. 1 is a schematic side view of a steering column constructed in accordance with the present invention.
Figure 2:
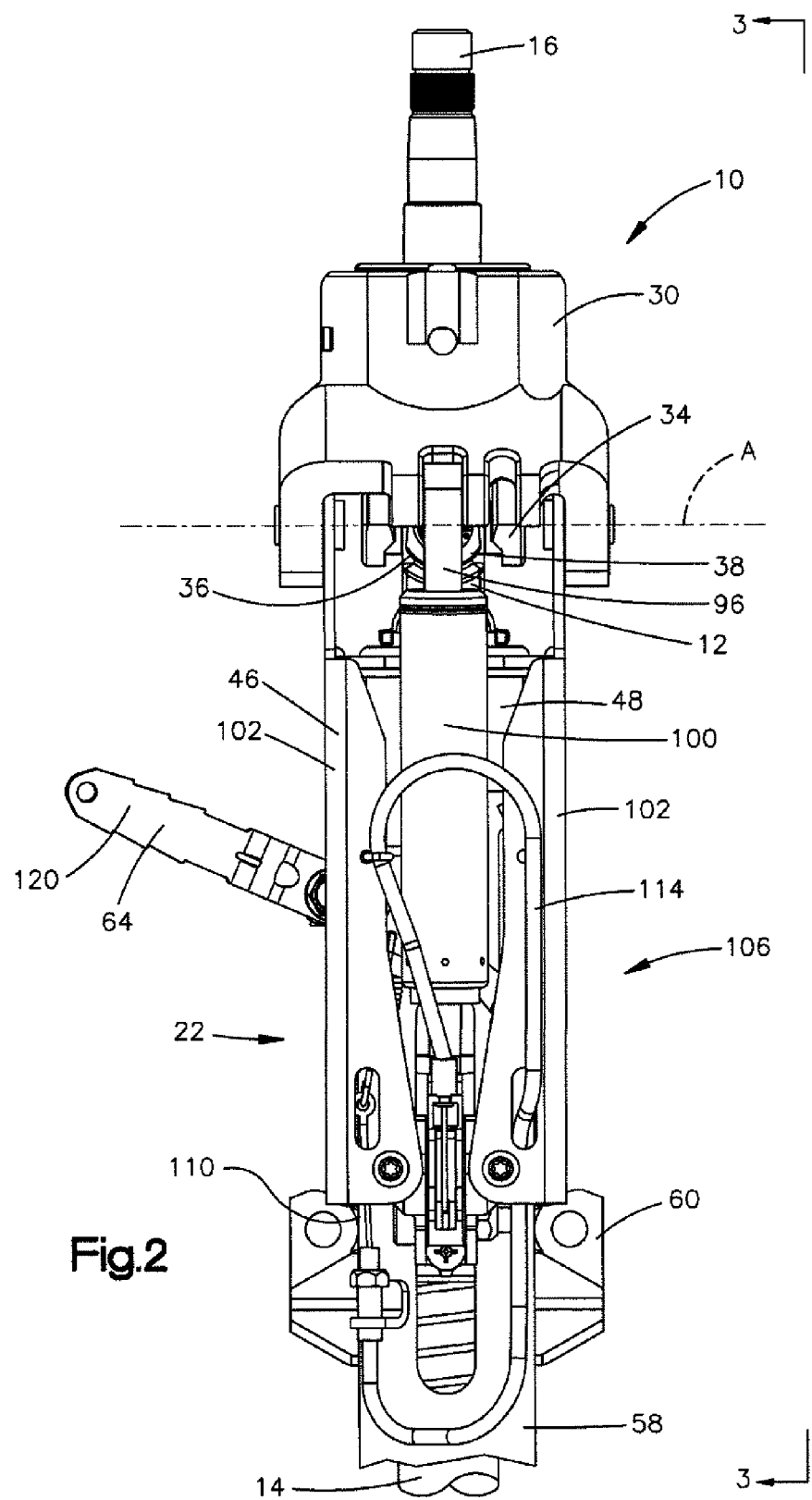
FIG. 2 is a view of the steering column taken along the lines 2-2 of FIG. 1.
Figure 3:
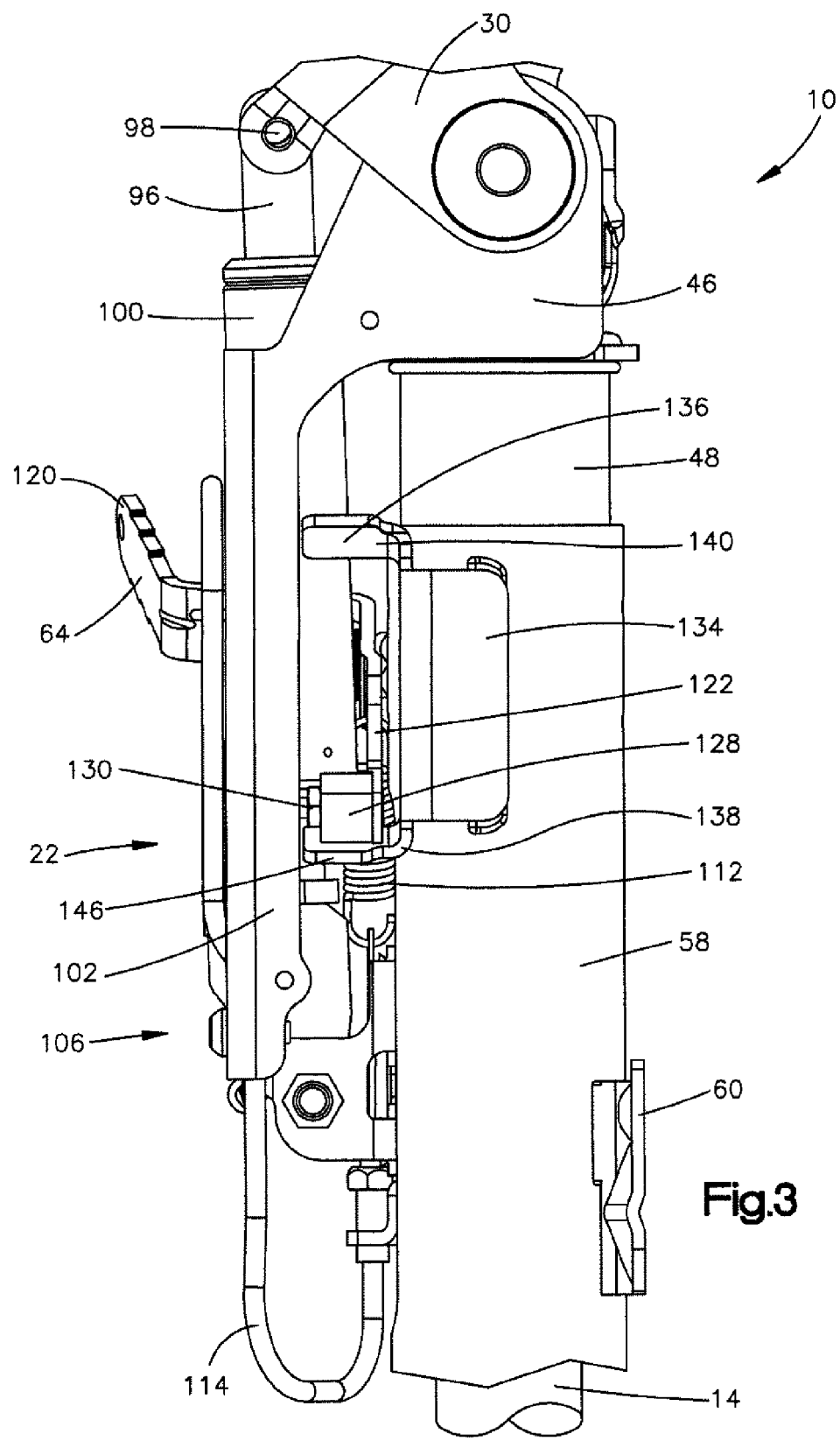
FIG. 3 is a view of the steering column taken along the lines 3-3 of FIG. 2.

The present invention is directed to an adjustable vehicle steering column 10 (FIGS. 1-3). The steering column 10 includes first and second steering column members 12, 14 and a third steering column member or input shaft 16 (FIG. 2). A vehicle steering wheel (not shown) is attached to the input shaft 16. The input shaft 16 and steering column members 12, 14 rotate upon rotation of the vehicle steering wheel. Steering column members 12, 14 telescope to effect axial adjustment of the steering wheel, as known in the art. The input shaft 16 is pivotable relative to the steering column member 12 to effect angular adjustment of the steering wheel.

A releasable telescope locking mechanism 20 (FIG. 1) locks the steering column members 12, 14 in any one of a plurality of telescope positions. A releasable tilt locking mechanism 22 locks the input shaft 16 in any one of an infinite number of pivot positions relative to the steering column member 12.

The input shaft 16 (FIG. 2) extends into an upper housing 30. Bearings (not shown) are located in the upper housing 30 and support the input shaft 16 for rotation relative to the upper housing. The input shaft 16 is connected to a yoke 34 of a universal joint 36. Another yoke 38 of the universal joint 36 is connected to the steering column member 12. The input shaft 16 can pivot, relative to the steering column member 12, about a pivot axis A of the universal joint 36. From the above, it should be clear that upon rotation of the steering wheel, the input shaft 16 and steering column member 12 rotate.

The upper housing 30 (FIG. 1) is pivotally connected to a bracket 46. The bracket 46 is connected to a jacket tube 48 circumscribing the steering column member 12. The upper housing 30 is pivotable about the axis A relative to the bracket 46 and the jacket tube 48. Therefore, the upper housing 30 pivots along with the input shaft 16 relative to the bracket 46 and the steering column member 12.

The steering column member 14 extends into a lower tubular shaft portion of the steering column member 12, as known in the art. The tubular shaft portion of the steering column member 12 may have internal splines thereon which mesh with external splines on the steering column member 14. The splines of the steering column member 12 mesh with the splines of the steering column member 14 to effect rotation of the steering column member 14 upon rotation of the steering column member 12, as known in the art. The splines also allow the steering column members 12, 14 to be moved axially (telescoped) relative to each other.

The steering column member 14 is connectable to an intermediate shaft (not shown). The intermediate shaft is attached to a steering gear (not shown) of the vehicle. The steering column member 14 is supported for rotation relative to the tubular support 58 which is connectable to a frame of the vehicle by at least one mounting bracket 60. Upon rotation of the steering wheel the input shaft 16 and the steering column members 12, 14 rotate and the rotational movement is transmitted to the intermediate shaft and the steering gear to effect vehicle steering.

A locking member or handle 64 is pivotally mounted on the tubular support 58. The handle 64 has a first or locked position, as shown in FIGS. 1 and 4, in which the telescope locking mechanism 20 and the tilt-locking mechanism 22 are locked. The handle 64 has a second or release position, shown in FIG. 6, in which the telescope locking mechanism 20 and the tilt-locking mechanism 22 are released. The handle 64 (FIG. 1) is pivotable about a pivot axis B relative to the support 58 between the locked and release positions. The input shaft 16 may be pivoted relative to the steering column member 12 and the steering column member 12 may telescope relative to the steering column member 14 when the handle 64 is in the second or release position.

The locking member or handle 64 rotates a clamping bolt 68 (FIG. 1) of the telescope locking mechanism 20 when the handle moves between the locked and release positions. The clamping bolt 68 extends through a first member 76 connected to a first clamping portion 78 of the support 58. The clamping bolt 68 also extends through a second member 80 connected to a second clamping portion 82 of the support 58. A nut 84 is connected with the second member 80. The nut 84 threadably engages the clamping bolt 68.

The first and second clamping portions 78, 82 are formed as part of the support member 58. Slots are cut in the support member 58 to form the first and second clamping portions 78, 82 so that the first and second clamping portions may clamp and release the jacket tube 48. Each of the first and second clamping portions 78, 82 extends approximately 90° around the jacket tube 48.

The clamping bolt 68 rotates with the handle 64 relative to the first and second members 76, 80 and the nut 84. The bolt 68 causes the first and second members 76 and 80 along with the first and second clamping portions 78, 82 to move toward each other when the handle 64 rotates from the release position to the locking position. The first and second clamping portions 78, 82 clamp the jacket tube 48 against the support 58 to prevent relative movement between the steering column members 12 and 14 when the handle 64 is in the locked position. Although, the telescope locking mechanism 20 is described as including a clamping bolt 68 for applying a clamping force, it is contemplated that the telescope locking mechanism may be any desired locking mechanism that prevents relative movement between the steering column members 12 and 14.

A tilt-lock bar 96 (FIGS. 1-3) is pivotally connected to the upper housing 30 by a pin 98. The tilt-lock bar 96 extends into a tubular member 100 (FIG. 2). The tubular member 100 is connected to axially extending portions 102 of the bracket 46. The tubular member 100 moves with the bracket 46, the steering column member 12, and the jacket tube 48 relative the support 58 during telescope adjustment of the steering column 10. The tilt-lock bar 96 moves relative to the tubular member 100 when the pivot shaft 16 tilts relative to the steering column member 12.

A hydraulic lock 106 prevents relative movement between the tilt-lock bar 96 and the tubular member 100 when the handle 64 is in the locked position. The hydraulic lock 106 permits relative movement between the tilt-lock bar 96 and the tubular member 100 when the handle is in the release position. A cable 110 (FIG. 1) has one end connected to the hydraulic lock 106 and an opposite end connected to a spring 112. The cable 110 extends through a sleeve 114 to the hydraulic lock 106. The spring 112 interconnects the cable 110 and the handle 64. Therefore, movement of the handle 64 from the locking position to the release position pulls the cable 110 to release the hydraulic lock 106. The tilt lock mechanism 22 may include a gas spring urging the input shaft 16 to pivot relative to the steering column member 12 when the hydraulic lock 106 is released.

Upon pivoting the handle 64 from the locking position to the release position, the cable 110 moves relative to the sleeve 114 to release the tilt locking mechanism 22. The telescope locking mechanism 20 is also released upon pivoting the handle 64 from the locking position to the release position to unlock the telescope locking mechanism. Therefore, the handle 64 releases both the telescope locking mechanism 20 and the tilt locking mechanism 22 upon movement to the release position. Upon pivoting the handle 64 from the release position to the locked position, the tilt locking mechanism 22 prevents the input shaft 16 from pivoting relative to the steering column member 12. The telescope locking mechanism 20 is also locked upon pivoting the handle 64 from the release position to the locked position to prevent relative movement between the steering column members 12, 14.

Although the steering column 10 is described as having a telescope locking mechanism 20 and a tilt locking mechanism 22, it is contemplated that the steering column may only have one of the telescope locking mechanism and the tilt locking mechanism. The steering column 10 has a telescope locking mechanism 20 if the steering column member 12 telescopes relative to the steering column member 14. The steering column 10 has a tilt locking mechanism 22 if the input shaft pivots relative to a steering column member 12. Therefore, the steering column 10 has at least one of the telescope locking mechanism 20 and the tilt locking mechanism 22.

The handle 64 (FIGS. 4-6) has a manually engageable end portion 120 on a first side of the pivot axis B and a second end portion 122 on a second side of the pivot axis B. The spring 112 is connected with the second end portion 122. Therefore, the spring 112 and the cable 110 move with the second end portion 122 when the handle 64 moves between the locked and release positions.

A magnet 128 is connected to the second end portion 122 of the handle 64. The magnet 128 is connected to the second end portion 122 by a fastener 130, such as a bolt. Therefore, the magnet 128 moves with the second end portion 122 of the handle 64 relative to the support 58 as the handle moves between the locked and release positions. The magnet 128 may be connected to the second end portion 122 in any desired manner.

A ferromagnetic member or bracket 134 is connected to the support 58. The bracket has a first or upper end portion 136 and a second or lower end portion 138. The first end portion 136 has a flange 140 extending away from the support 58. The flange 140 has a surface 142 facing toward the lower end portion 138. The second end portion 138 has a flange 146 extending away from the support 58. The flange 146 has a surface 148 facing toward the first end portion 136.

The second end portion 122 and the magnet 128 extend between the flanges 140 and 146 of the member 134. The magnet 128 is magnetically attracted to the flanges 140 and 146. The magnet 128 engages the surface 148 of the bracket 134 when the handle 64 is in the locked position. The magnet 128 engages the surface 142 of the bracket 134 when the handle 64 is in the release position. Accordingly, the magnet 128 helps retain the handle 64 in the locked and release positions.

Although the handle 64 is described has having a magnet 128, it is contemplated that the handle 64 may include a flange and the first and second end portions 136 and 138 of the bracket 134 may include magnets that retain the handle in the locked and release positions. Also, it is contemplated that a magnet may only retain the handle 64 in one of the locked and release positions. Therefore, one of the handle 64 and the bracket may include at least one magnet to retain the handle in one of the locked and release positions. It is further contemplated that the magnets may be electromagnets and/or permanent magnets.

From the above description of the invention, those skilled in the art will perceive improvements, changes and modifications. Such improvements, changes and modifications within the skill of the art are intended to be covered by the appended claims.

Having described the invention, the following is claimed:

1. A steering column for use in a vehicle, said steering column comprising:
   first and second steering column members movable relative to each other;
   a locking mechanism for preventing relative movement between the first and second steering column members;

a locking member having a locked position in which the locking mechanism prevents relative movement between the first and second steering column members, the locking member having a release position in which the locking mechanism permits relative movement between the first and second steering column members; and a magnet retaining the locking member in at least one of the locking position and the release position.

2. A steering column as set forth in claim 1 wherein the magnet retains the locking member in the locking position and the release position.

3. A steering column as set forth in claim 1 wherein one of the magnet and a ferromagnetic member is connected with the vehicle and another of the magnet and the ferromagnetic member is connected with the locking member.

4. A steering column as set forth in claim 3 wherein the magnet is connected with the locking member and the ferromagnetic member is connected with the vehicle.

5. A steering column member as set forth in claim 4 wherein the locking member pivots about an axis relative to the steering column, the locking member having a first end portion on a first side of the pivot axis and a second end portion on a second side of the pivot axis, the magnet being connected to the second end portion of the locking member.

6. A steering column as set forth in claim 5 wherein the first end portion of the locking member is manually engageable.

7. A steering column as set forth in claim 1 wherein the first steering column member is axially movable relative to the second steering column member, the locking mechanism preventing relative axial movement between the first and second steering column members when the locking member is in the locked position, the locking mechanism permitting axial movement between the first and second steering column members when the locking member is in the release position.

8. A steering column as set forth in claim 7 wherein a third steering column member is pivotable relative to the first steering column member, the locking mechanism preventing pivotal movement of the third steering column member relative to the first steering column member when the locking member is in the locked position, the locking mechanism permitting pivotal movement of the third steering column member relative to the first steering column member when the locking member is in the release position.

9. A steering column as set forth in claim 1 wherein the first steering column member is pivotable relative to the second steering column member, the locking mechanism preventing pivotal movement of the first steering column member relative to the second steering column member when the locking member is in the locked position, the locking mechanism permitting pivotal movement of the first steering column member relative to the second steering column member when the locking member is in the release position.

10. A steering column member as set forth in claim 1 wherein the locking member pivots about an axis relative to the steering column, the magnet being connected to an end portion of the locking member such that the magnet pivots with the locking member about the axis.

11. A steering column for use in a vehicle, said steering column comprising:

first and second steering column members movable relative to each other;

a locking mechanism for preventing relative movement between the first and second steering column members;

a locking member having a locked position in which the locking mechanism prevents relative movement between the first and second steering column members, the locking member having a release position in which the locking mechanism permits relative movement between the first and second steering column members, the locking member pivoting about an axis relative to the steering column, the locking member having a first end portion on a first side of the pivot axis and a second end portion on a second side of the pivot axis;

a magnet connected with the second end portion of the locking member and retaining the locking member in at least one of the locking position and the release position; and a ferromagnetic member connected with the vehicle and including flanges, wherein the magnet extends between the flanges on the ferromagnetic member, the magnet engaging one of the flanges when the locking member is in the locked position, the magnet engaging the second flange when the locking member is in the release position.

12. A steering column for use in a vehicle, said steering column comprising:

first and second steering column members movable relative to each other;

a locking mechanism for preventing relative movement between the first and second steering column members;

a locking member pivotable relative to the steering column to a locked position in which the locking mechanism prevents relative movement between the first and second steering column members, the locking member being pivotable to a release position in which the locking mechanism permits relative movement between the first and second steering column members;

a bracket connected with the vehicle; and a magnet for retaining the locking member in at least one of the locking position and the release position by magnetically securing the locking member to the bracket.

13. A steering column as set forth in claim 12, wherein the magnet is secured to and pivotable with the locking member between flanges on the bracket.

* * * * *